Feb. 7, 1956 G. T. TERAZONO 2,733,536
SPREADER FOR FISHING LINES
Filed Feb. 6, 1953
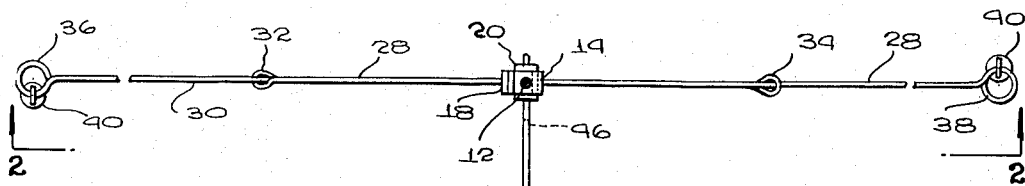
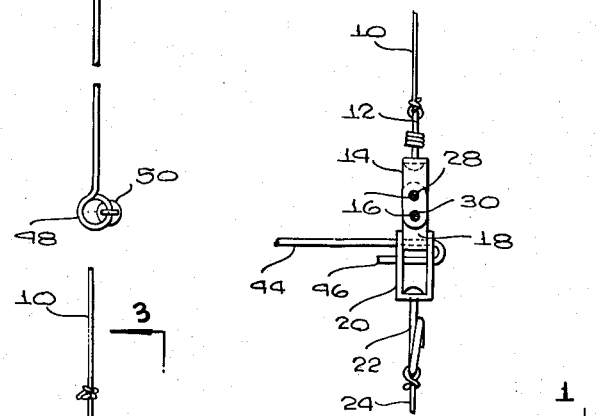
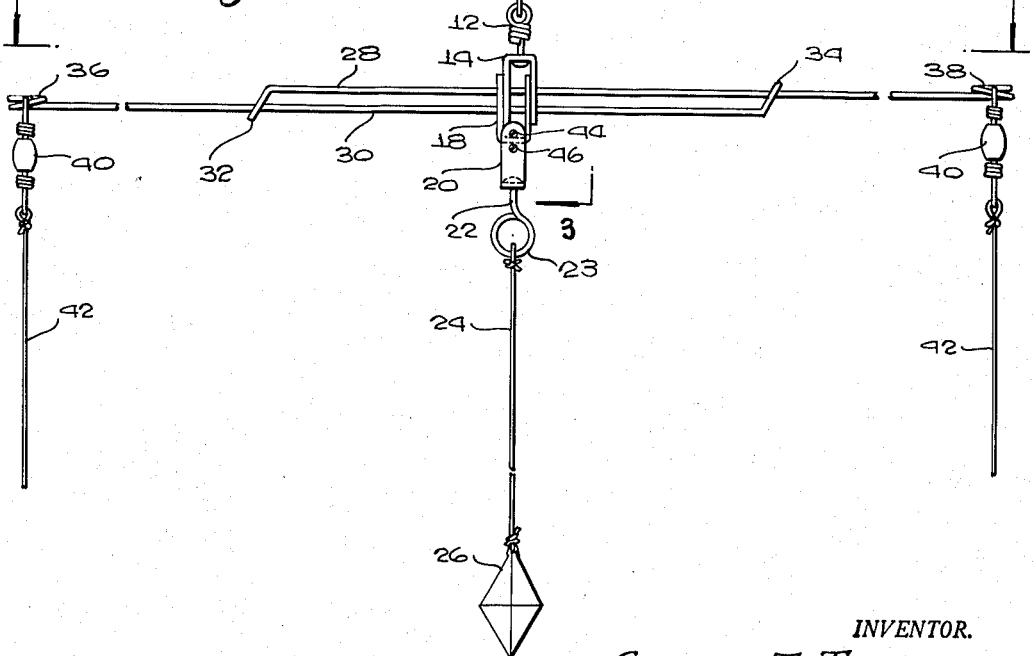
INVENTOR.
GEORGE T. TERAZONO
BY
McMorrow, Berman + Davidson
ATTORNEYS

United States Patent Office 2,733,536
Patented Feb. 7, 1956

2,733,536

SPREADER FOR FISHING LINES

George T. Terazono, Kealakekua, Territory of Hawaii

Application February 6, 1953, Serial No. 335,465

2 Claims. (Cl. 43—42.74)

This invention relates to a spreader for fishing lines. More particularly, the invention has reference to a generally improved spreader formed substantially to a T shape so as to provide for triangular spacing of the baits. Summarized further the spreader is so constructed as to permit relative telescopic adjustment of the arms of the T-shaped structure, with the leg of said structure being extended normally to the telescopically related arms at all times. A plurality of U-shaped support members are connected to one another and to the arms and the leg of the T in such a manner as to continuously hold said leg in normal position relative to the arms, while at the same time permitting the desired telescopic adjustment of the arms, said support members providing a means for attachment of a fishing line and sinker support line, with the sinker support line being aligned with the fishing line and depending vertically from said means at a location where it will not interfere with the several baits.

One important object of the present invention is to provide a spreader as described which will be easier to handle than conventional spreaders such as, for example, a "four-way" spreader of X shape.

Another important object is to provide a spreader which will be more efficient in use than a conventional spreader of the type referred to above, it being my observation that the design of a conventional spreader is such as makes it difficult to keep all the baits away from the sinker under the action of the current.

Still another object is to provide a spreader which will increase the probabilities of catching two fishes at one time.

Other objects and advantages will appear from the following description, the claims appended thereto, and from the annexed drawing, in which like reference characters designate like parts throughout the several views, and wherein:

Figure 1 is a sectional view of the spreader constituting the present invention, taken on line 1—1 of Figure 2;

Figure 2 is a sectional view taken on line 2—2 of Figure 1; and

Figure 3 is a fragmentary sectional view taken on line 3—3 of Figure 2.

The spreader constituting the present invention can be attached as a unit to a main fishing line or leader 10 extending into the water from a rod or other fishing device, not shown.

At its lower end, the fishing line 10 is connected to the eye of a swivel stem 12. Stem 12 has a head on its lower end, underlying and supporting the bight of a first support member 14. The first support member 14 is of inverted U-shape, and has an opening in its bight through which stem 12 is loosely extended, to permit free rotation of the first support member upon the stem.

Formed in and spaced longitudinally of the legs of the first support member are openings 16. A pair of such openings is provided in each leg, with the openings of one leg opposite the corresponding openings of the other leg.

A second support member 18 is of U-shape, and is disposed between the first support member and a third support member 20. The third support member is also of U-shape.

In the bight of the third support member I form a center opening, receiving the stem of a swivel element 22. Element 22 has a head at its upper end overlying and supported upon the bight of the third support member. At its lower end, element 22 has an eye 23, to which is connected the upper end of a sinker support line 24. A sinker 26 is connected to the lower end of said line 24.

In the upwardly projecting legs of the second support member 18 I form openings that register with the openings 16 of the first support member when, as shown in Figure 2, the first and second support members 14, 18 are disposed with their legs contacting longitudinally in an overlapping relationship.

Through the registered openings of the first and second support members there are extended telescopically related rods 28, 30. The rods 28, 30 are disposed in closely spaced, parallel relation, and are slidable in the registered openings of the first and second support members. Thus, the first support member 14 supports the rods 28, 30 for relative telescopic adjustment of the rods, while the rods themselves support the second support member to the first support member.

At one end, which can appropriately be termed the inner end, the rod 28 has a downwardly extending eye 32 in which the midlength portion of the rod 30 is loosely and slidably positioned. The inner end of rod 30 is formed with an upwardly extended eye 34 in which the rod 28 is correspondingly mounted for sliding movement. Thus, the rods are connected to one another for relative telescopic adjustment.

At its outer end, rod 30 has an eye 36 disposed in a horizontal plane, while the rod 28 has an eye 38 also disposed in a horizontal plane. A swivel 40 is connected to eye 36, and a like swivel 40 is connected to eye 38. Hook support lines 42 are attached to the lower ends of the swivels 40, and will be adapted, at their lower ends, for connection thereto of hooks or lures, not shown.

Arranged normally to the rods 28, 30 (Figure 1) is a third rod 44, said third rod projecting laterally from the rods 28, 30. At its inner end, rod 44 is reversely bent as at 46 (Figure 3), the reversely bent end of rod 44 being engaged about the bight of the second support member 18. Thus, the second support member 18 supports rod 44.

The reversely bent end of the rod 44 is extended through openings spaced longitudinally of the respective legs of the third support member 20, said legs of the third support member embracing between them the bight of the second support member. As a result, the third support member is dependingly supported by the rod 44.

At its outer end, the third rod 44 has an eye 48 disposed in a horizontal plane, and connected to said eye 48 is a third swivel 50, to which would be attached another hook support line.

By reason of the construction illustrated and described, the support members 14, 18, 20 cooperate to define a means that is connectible to a fishing line 10 and sinker support line 24 respectively, which means will afford a centrally disposed support assembly for the rods 28, 30, 44. The support assembly so defined, in this regard, is so constructed as to permit the parallel rods 28, 30 to define the arms of a T-shaped spreader structure, which arms will be telescopically related, the rod 44 defining the leg of said T-shaped structure, which leg will project laterally at all times from the arm portion of said structure.

The baits are at all times spaced away from the sinker, and from one another. In this connection, the construction is so arranged as to permit one to miss catching a fish when a strike is made at one of the baits, while still being left two chances to make the catch. Conventional spreaders of which I am aware leave one with only one more chance if there is a miss.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A spreader for fishing lines comprising: a pair of telescopically related rods adapted for attachment of depending hook support lines thereto; a first support member in which said rods are slidably mounted for relative telescopic adjustment, said first support member being adapted for attachment of a fishing line thereto; a second support member supported by said rods; a third rod also adapted for attachment of a hook support line thereto and having a reversely bent end engaged with the second support member, said third rod extending laterally from the first-named rods; and a third support member depending from said reversely bent end and adapted for connection of a sinker support line thereto.

2. A spreader for fishing lines comprising: a pair of telescopically related rods adapted for attachment of depending hook support lines thereto; a first support member of inverted U-shape having legs in which said rods are slidably mounted for relative telescopic adjustment, said first support member being adapted for attachment of a fishing line thereto; a second support member supported by said rods, the second support member being of U-shape with legs overlapping the legs of the first member, the rods being slidable in the legs of the second member; a third rod also adapted for attachment of a hook support line thereto and having a reversely bent end engaged about the bight of the second support member, said third rod extending laterally from the first-named rods; and a third support member of U-shape having legs embracing said bight with the reversely bent end of the third rod extending through said legs of the third support member, said third support member depending from said reversely bent end and being adapted for connection of a sinker support line thereto.

References Cited in the file of this patent

UNITED STATES PATENTS

| | | |
|---|---|---|
| 353,412 | Behrens | Nov. 30, 1886 |
| 550,417 | Miller | Nov. 26, 1895 |
| 1,352,979 | Lawrence | Sept. 14, 1920 |
| 2,145,992 | Parker | Feb. 7, 1939 |
| 2,352,631 | Guarnieri | July 4, 1944 |
| 2,663,966 | De Mello | Dec. 29, 1953 |

FOREIGN PATENTS

| | | |
|---|---|---|
| 23,577 | Great Britain | 1911 |
| 535,102 | France | Apr. 10, 1922 |